Patented May 18, 1943

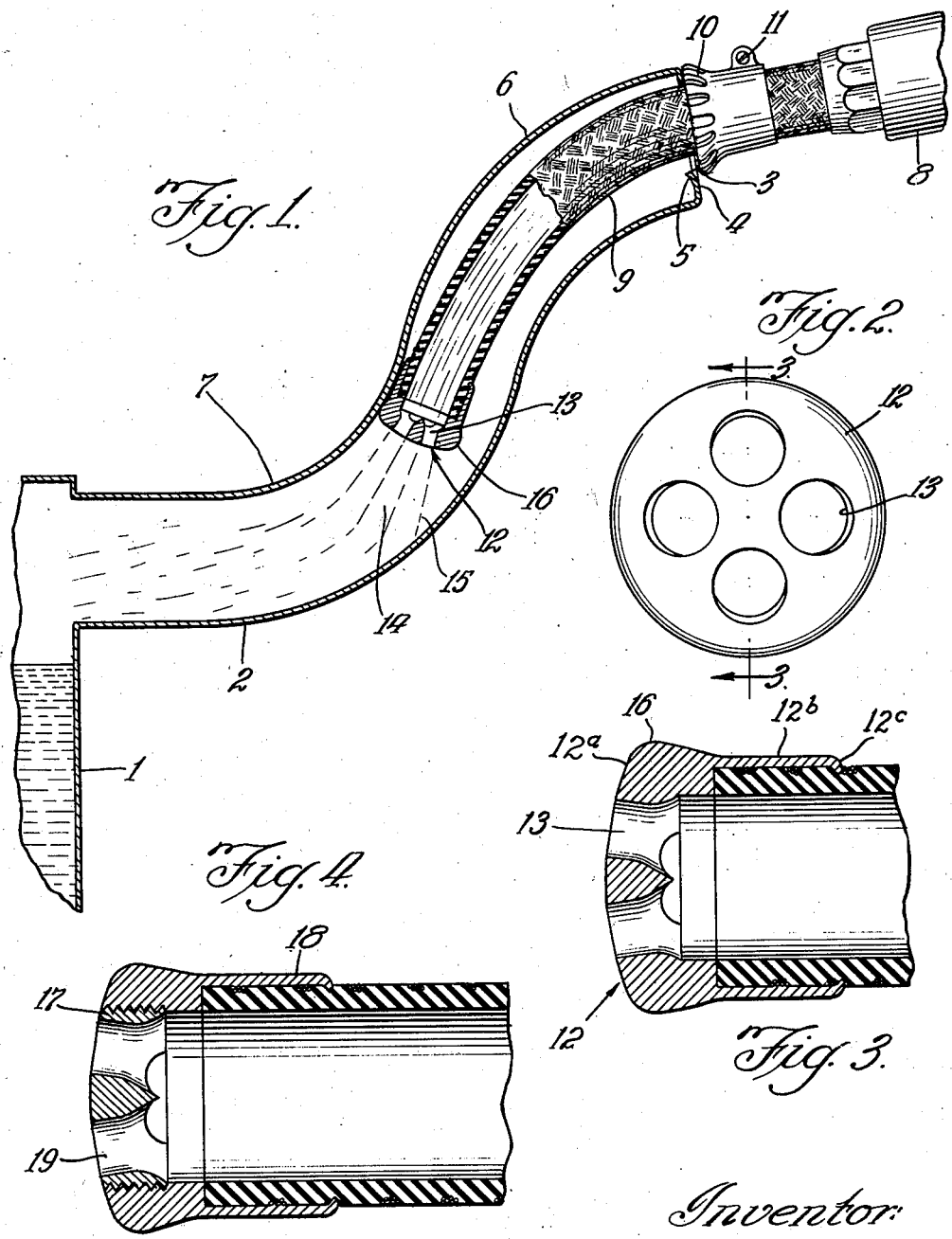

2,319,567

UNITED STATES PATENT OFFICE 2,319,567

METHOD OF FILLING TANKS

Albert Vegell, Chicago, Ill., assignor, by mesne assignments, to Spraying Systems Co., Chicago, Ill., a corporation of Illinois Application September 30, 1940, Serial No. 358,952

2 Claims. (Cl. 221—84)

My invention relates to a liquid discharge nozzle which is particularly adapted to supply liquid to a tank through an elongated or sharply curved inlet pipe without the objectionable surging and splashing back of the liquid that commonly occurs when there is a back flow of air through the inlet pipe.

In most modern automobiles the gasoline tank is usually arranged with a relatively long and oftentimes a abruptly curved inlet pipe leading therefrom through a rear fender or portion of the car body. As these tanks are closed there is an outward flow of escaping air through the inlet pipe as the tank is filled and with the ordinary open end nozzles commonly employed at filling stations, this outward air flow oftentimes causes incoming liquid to splash outwardly through the open end of the inlet pipe. Apparently with such nozzles, the inrushing liquid has a tendency to splash or spread in the inlet pipe and obstruct the air escape and whenever this occurs a slight air pressure is built up in the tank which forces some of the incoming liquid outwardly through the inlet pipe so that it overflows therefrom. I have found that this can be avoided by introducing the liquid into the tank inlet pipe in a manner to preserve air escapement passageways or spaces therein within or around the entering liquid so that the liquid does not close off air escapement from the tank.

The principal objects of the present invention are to provide an improved tank filling arrangement; to create a self venting flow of liquid as it is discharged into a filler pipe of an otherwise enclosed tank; to provide an air counterflow passage within the confines of a discharged liquid stream; to permit an increased flow rate in filling a tank; to reduce surging in the filler pipe of a tank during a filling operation; and to direct fuel discharged into the filler pipe of a tank against the side walls of the filler pipe while leaving an air counterflow passage within the fuel discharge stream, these and other objects being accomplished as pointed out in the following description wherein reference is made to the accompanying drawing, in which:

Fig. 1 is a view, partly in vertical section, showing a fragmentary portion of a fuel tank with inlet pipe in which the discharge end of a filler pipe involving the filler pipe and present invention is inserted;

Fig. 2 is an enlarged end view of the nozzle shown in Fig. 1;

Fig. 3 is a fragmentary longitudinal sectional view of the nozzle taken on the line 3—3 of Fig. 2; and Fig. 4 is a view, similar to Fig. 3, showing a modified nozzle construction.

Referring to the drawing a tank, a fragment of which is illustrated at 1 in Fig. 1, is of a type generally employed as a fuel tank in automobiles. In this type of tank the only vent to the atmosphere is usually through an inlet pipe 2 arranged to discharge at its lower end into the tank 1. The inlet pipe is provided with a filler cap, not shown, of a conventional type arranged to have cam locking or screw threaded engagement with the open outer or upper end 3 of the filler pipe 2. In the embodiment illustrated an inturned flange 4 having a cam portion 5 is provided to secure a filler cap in position on the inlet pipe 2.

In modern automobiles it is customary to have the filler opening 3 located on a rear fender or on a body portion of the automobile remote from the fuel tank and for that reason the inlet pipe must of necessity be long and in most cases, in order to avoid necessary structural parts of the automobile, must be constructed with one or more curves as at 6 and 7.

A hose 8, of the type ordinarily used at filling stations in connection with gasoline pumps, is provided with a flexible extension 9 adapted for insertion in the inlet pipe 2. This flexible extension or nozzle may have a stop collar 10 adjustably secured thereon as by means of a clamp screw 11 to engage the outer end of the inlet pipe 2 to thereby limit the degree of insertion of the nozzle a in the inlet pipe.

Ordinarily where a tube or nozzle is thus provided for filling a fuel tank of this nature, the nozzle is simply an open ended tube so that the gasoline is discharged therefrom in a solid stream which spreads out as it emerges and strikes against the wall of the inlet pipe and, especially where it strikes a curved portion of the pipe, has a tendency to surge and close off the opening in the inlet pipe causing splashing and overflow as above set forth.

In accordance with my improved construction the fuel discharge is arranged in such a manner as to preserve an air passage through or around the discharging liquid in the inlet pipe so that the air, venting from the tank as it is displaced by inflowing liquid fuel, is not obstructed by the liquid but has free venting through the passage thus formed. This is accomplished in the illustrated structure by providing the nozzle or tube 9 with an end closure 12 having openings 13 arranged therein in slightly diverging relation to each other and to the central axis of the nozzle. The number of openings is not material to the invention but I have found that three, or as here illustrated, four openings are satisfactory. The angle of divergence of the openings from the central axis of the nozzle should be between 2° and 8°, and I have found that an angle of divergence of 5° appears to be most satisfactory. The inner surfaces of the openings 13 are preferably smoothly finished and rounded to produce a full regular discharge.

With this arrangement the inflowing liquid is broken up into a number of streams so that not only are air spaces formed between the streams themselves as at 14, but between the streams and the wall of the inlet pipe as at 15. The discharged streams by following divergent paths due to the divergence of the openings through which they issue strike the inlet pipe wall at spaced intervals, tending to spread the liquid over a large wall area to thereby still further avoid the tendency of the liquid to close off or clog the inlet pipe.

As will be clearly seen in the drawing, the novel end closure or nozzle 12 is readily attachable to practically any type of flexible dispensing conduit, such as is customarily used with gasoline dispensing pumps. Thus, in the illustrated embodiment, the nozzle of the present invention is in the form of a body portion 12ª through which the diverging openings 13 extend, and this body portion carries, preferably integral therewith, a cylindrical extension in the form of a hollow neck 12ᵇ. As clearly seen, the free end of the dispensing conduit 9 is received snugly within the neck portion 12ᵇ and the present nozzle may thus be held in place by frictional engagement of the conduit with the neck portion of the nozzle. Obviously, other more positive means may be employed for securely attaching the nozzle to the conduit and for this purpose, the outer peripheral edge of the neck 12ᵇ may be inwardly crimped as clearly seen at 12ᶜ.

The discharge end of the nozzle 9 is preferably slightly enlarged as at 16 to maintain the discharged stream out of contact with the wall of the inlet pipe in the immediate vicinity of the tube. This construction permits a free flow of air entirely around the upper end of each of the discharged streams.

Several forms of discharge outlet are capable of the arrangement of the present invention. As one modification which is especially adapted for the conversion of present round outlet nozzles now in the field I provide an externally threaded plug 17 of a size to be threadedly insertible in a conventional nozzle indicated at 18, which may have a body portion provided with an internal bore of approximately the same diameter as the internal diameter of the dispensing conduit to which it is attached, by the cutting of internal threads in said nozzle to receive the plug 17. Liquid discharge ports 19 are provided in the plug 17 which ports may be similar to the ports 13 illustrated in Figs. 2 and 3.

The specific shape of the outlet port is capable of various modifications as will be apparent to those familiar with the art, and can also be varied as required for adaptation to the different types of nozzles in which it is desired to incorporate the invention. It is to be understood, therefore, that while I have shown and described my invention in a preferred form I am aware that various modifications may be made therein without departing from the spirit of my invention, the scope of which is to be determined by the appended claims.

I claim as my invention:

1. The method of filling liquid holding tanks having an elongated filling pipe which comprises introducing the liquid into the filling pipe in a plurality of relatively fine divergent streams, whereby air vent spaces are provided between the streams for preventing the entrapment of air in the tank and filling pipe thereof.

2. The method of filling liquid holding tanks having an elongated filling pipe which comprises introducing the liquid into the filling pipe in a plurality of relatively fine laterally spaced streams, whereby air vent spaces are provided between the streams for preventing the entrapment of air in the tank and filling pipe thereof.

ALBERT VEGELL.